Nov. 10, 1953     C. SHEER     2,658,505
ARTERIAL PULSE WAVE VELOCITY METER
Filed March 8, 1949     4 Sheets-Sheet 1
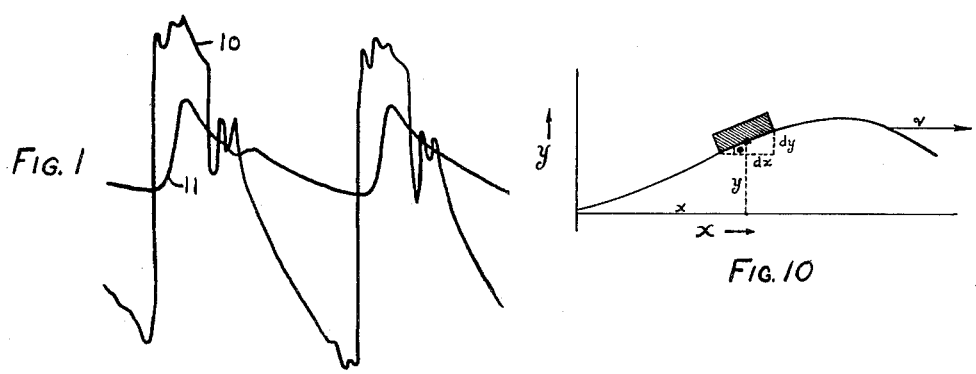
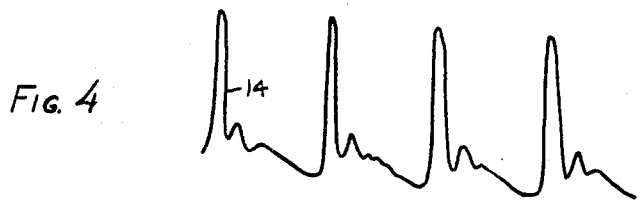
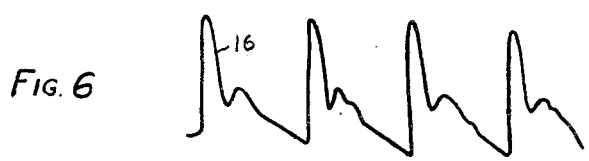
INVENTOR.
BY Charles Sheer
Willis B. Rice
ATTORNEY Nov. 10, 1953          C. SHEER          2,658,505

ARTERIAL PULSE WAVE VELOCITY METER

Filed March 8, 1949          4 Sheets-Sheet 2

INVENTOR
CHARLES SHEER

BY

ATTORNEY

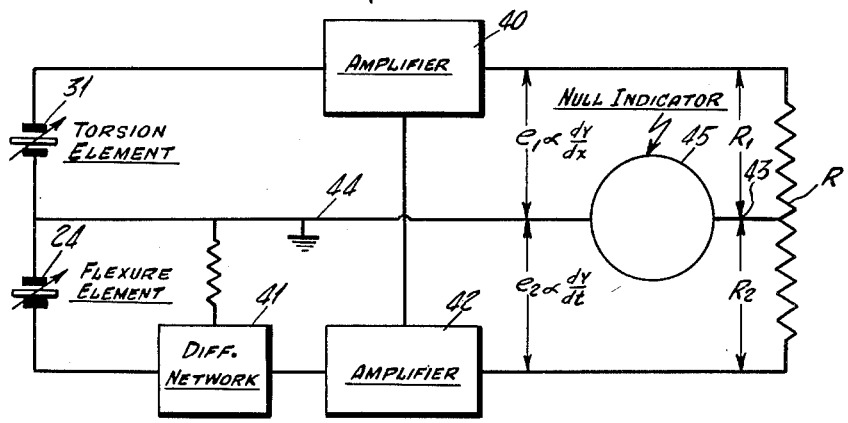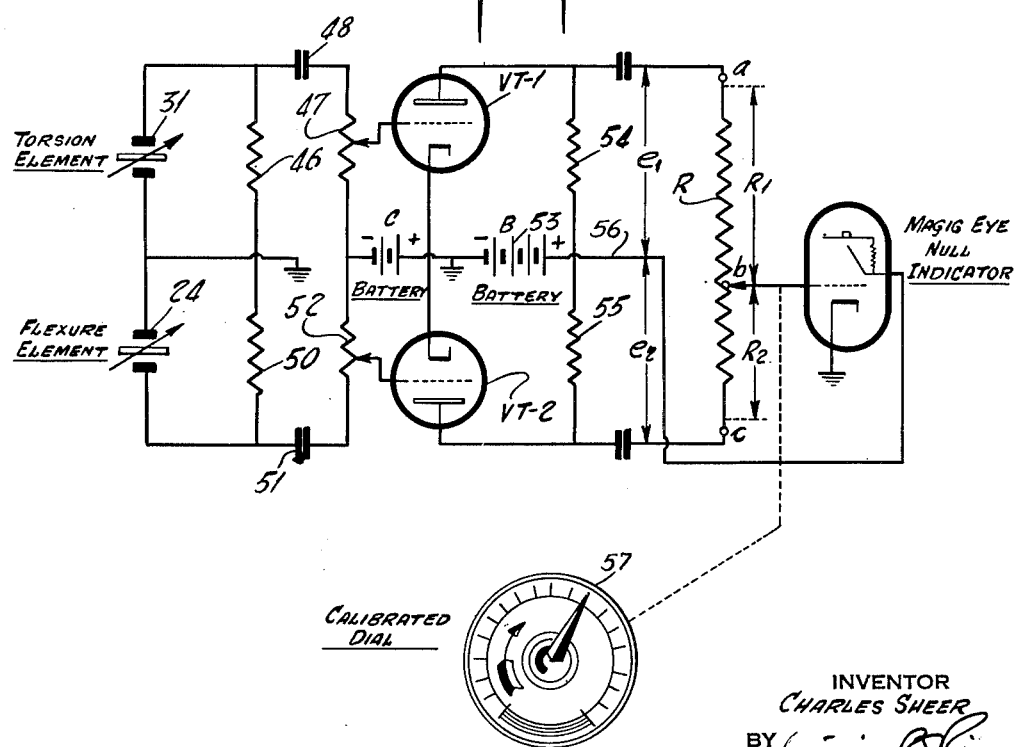

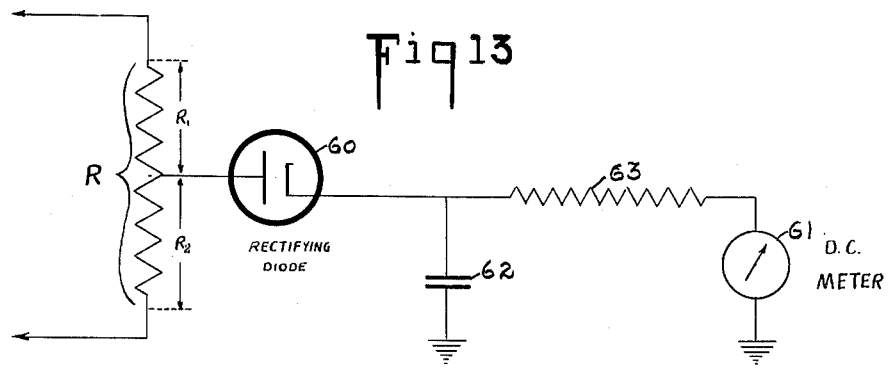
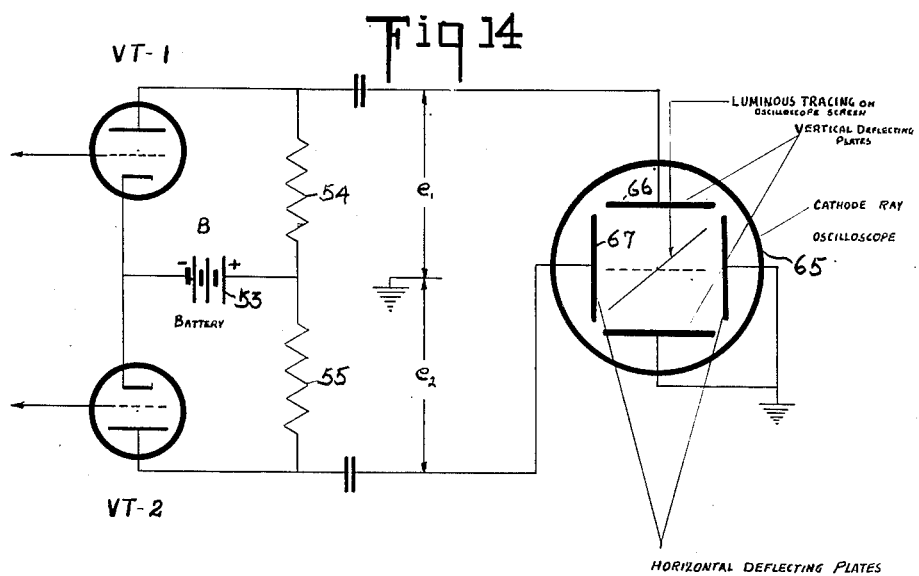

Patented Nov. 10, 1953

2,658,505

UNITED STATES PATENT OFFICE 2,658,505

ARTERIAL PULSE WAVE VELOCITY METER

Charles Sheer, New York, N. Y.

Application March 8, 1949, Serial No. 80,130

4 Claims. (Cl. 128—2.05)

The object of this invention is to provide an instrument for measuring the velocity of the arterial pulse wave, which follows the heart beat in human beings and in animals of similar physiological structure.

Heretofore, the most common direct measurement used in the diagnosis of the arterial condition has been that of blood pressure. Such measurements give valuable information as to the action of the heart and as to the condition of the cardio vascular system, but diagnosis of these conditions from blood pressure alone is often insufficient. Throughout a long period of time in the life of an individual the gradual hardening of the circulatory system is commonly compensated for by an increase in the heart action. Thus, a rise in blood pressure is commonly associated with hardening of the arteries. There are, however, many other factors which may likewise cause a change in blood pressure, such as excessive physical or emotional activity, or drugs and other pathological factors, interfering with the differential diagnosis of a sclerotic condition. To minimize this difficulty, other data must be considered, the acquisition of which involves a considerable time, and even then the causal factors for high blood pressure can be evaluated only in accordance with the skill and judgment of the diagnostician.

It follows that blood pressure alone cannot be relied upon as an indication of cardiac conditions until the sclerotic condition is known, and yet it cannot be relied upon to indicate the sclerotic conditions until the other factors have been evaluated.

In accordance with this invention, it has been discovered that the elasticity of the arterial system can be separately obtained by measurement of the velocity of propagation of the pulse wave through the arterial system, a factor which will be referred to herein as the pulse wave velocity. The measurement may be made in general at any point where a principal artery is exteriorized; that is, at any point where such an artery comes close enough to the surface to have the pulse detectable at the surface. Where in this specification we refer to having contact with the artery, this is but a convenient way of saying "make such contact with the surface above the artery that the pulsations of the artery themselves may be measured by the pulsation of the skin at the surface above the artery."

We may consider the arterial and arteriole system of the body as an elastic medium, and the arterial pulse as a compressional wave traveling in such a medium. If the wave took place in a rigid medium, the wave motion would follow the same laws as sound traveling in water. With a pulse wave, however, the elasticity of the arteries changes the phenomenon to the point where the physical constants of the blood play little part in determining pulse wave velocity.

We may for convenience think of the blood as an incompressible fluid filling and transmitting pressure to the walls of a highly elastic tube. We therefore may consider the wave as taking place in the arterial walls themselves as a propagated distention following the heart beat.

In a perfectly elastic medium the elasticity of the walls would be a constant, and the distention would be a linear function of the blood pressure. In actual fact, however, this is not the case, since the elasticity changes as the blood pressure and the degree of distention are changed, and this relation itself is a function of the sclerotic condition. Thus in turn the pulse wave velocity becomes a function of the blood pressure and the sclerotic condition, from which the sclerotic condition can be determined if the blood pressure be also known from the standpoints of time and subjective judgment of the examiner.

The value of a quantitative measurement of sclerosis in cardiovascular diagnosis as well as in longevity determinations is self-evident.

Furthermore, once the sclerosis factor has been determined for a given physiological system or for a given portion of a physiological system, it may normally be regarded as a constant over a time which is short compared to the life of the subject. Thereafter, pulse wave velocity measurements for an individual may be calibrated in terms of blood pressure. Thus continuous instantaneous recording, or visual indications of blood pressure during critical periods, or over a period of time can be taken without difficulty and without discomfort to the patient. Such continuous recordings of blood pressure deviations from an initial absolute value can be easily taken over a period of many hours, and may be made instantaneously and continuously visible. This is of great value, particularly for cardiac patients and for patients undergoing surgical operations.

Finally, once a correlation between age, blood pressure, and pulse wave velocity has been established, there will be made available an extremely simple method of detecting pathological conditions, which requires only a few seconds to complete, and which may be conducted by any intelligent technician. The value of such a method is obvious in military, educational, industrial and similar establishments, where a constant check on the public health is possible, involving very little cost.

The method of determining a pulse wave velocity which first suggests itself, is to measure the time of passage of the wave from one point to another point a known distance from it. For example, we might apply a transducer upon the brachial artery near the elbow and another on the radial artery in the wrist. A careful measurement of the difference in time between the arrival of the wave peak at these two points, the distance being known, would give a velocity factor.

This principle has many drawbacks in actual practice. It is difficult to insure that both pickups are maintained in position with sufficient accuracy to generate an adequate sphygmographic tracing at all times. This is particularly true of the pick-up on the elbow, which requires care and effort in attachment, and which is easily displaced by slight motions of the arm.

Moreover, whereas a small transducer at the wrist can be worn without discomfort, such a device upon the elbow is inconvenient and uncomfortable, particularly if worn for any length of time, or during sleep. For practical operation, therefore, it is important that the measurement be taken by a single device. This possesses the additional advantage that if it be desired to measure differences in the sclerotic factor in different portions of the body, the single instrument can be placed at the point desired without having its reading obscured by conditions in other portions of the body.

A practical form of apparatus for this direct measurement principle comprises a single instrument having buttons spaced a fixed distance apart, say one centimeter, upon the same artery, together with mechanisms for measuring the difference in time of arrival of the wave at these two points. This in effect combines the two transducers of the above described devices into a single two-button instrument. Such a multiple button method has proved successful in practice, and is feasible to construct.

I have found, however, that better results can be obtained by a single button method, which I therefore prefer. The reason for my preference is that, the two-button construction, while in principle quite simple, requires considerable accuracy for the associated apparatus, since the phase difference between the two buttons would be of the order of $\frac{1}{350}$ to $\frac{1}{500}$ of a cardiac cycle. Moreover, since the exterioration of the radial artery is generally not in excess of three quarters of an inch in length, the application of two spaced buttons within that distance requires that the buttons themselves be so small, that some difficulty is experienced in keeping them in contact with the artery at the wrist. The apparatus necessary for evaluating the instrument response in such a case is, moreover, complex.

The invention accordingly comprises an article of manufacture possessing the features, properties and the relation of elements which will be exemplified in the article hereinafter described and the scope of the application of which will be indicated in the claims.

For a fuller understanding of the nature and objects of the invention, reference should be had to the following detailed description taken in connection with the accompanying drawings, in which:

Fig. 1 shows standard sphygmograms recorded simultaneously from the subclavian and radial arteries, respectively.

Figs. 2, 3, 4, 5, and 6 are sphygmograms corresponding to normal pulse, and of the pulse of cases or aortic stenosis, aortic regurgitation, arterial hypertension, and arterial hypotension.

Fig. 10 is a diagram showing the operation of the apparatus of Figs. 7, 8, and 9.

Fig. 11 is a diagram of apparatus for measuring the ratios.

Fig. 12 is a diagram of a measuring circuit.

Fig. 13 is a diagram of an alternative detail of the measuring circuit.

Fig. 14 is a diagram of another alternative for continuous instantaneous indication.

Figure 7:
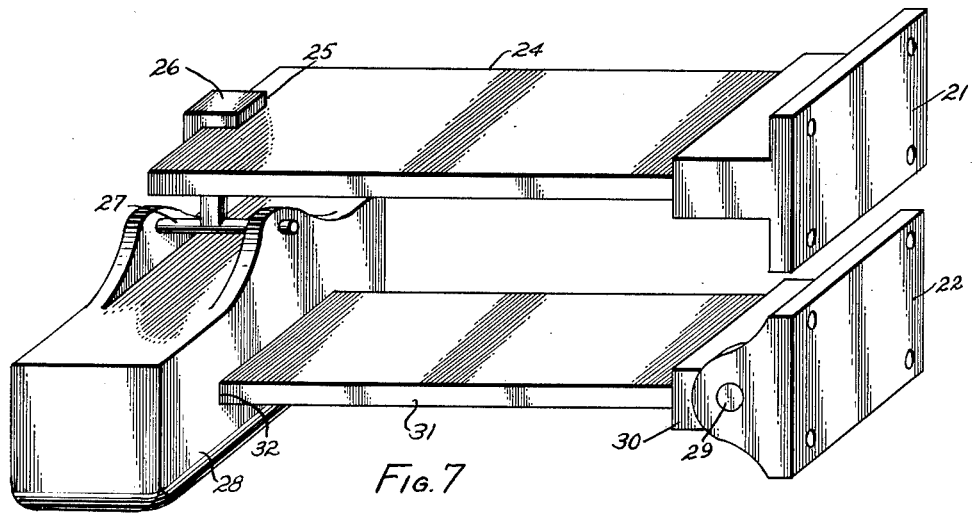
Figs. 7 and 8 are a perspective view and a cross section respectively of an apparatus in accordance with this invention.

The preferred form of the invention here illustrated is based upon the following principles:

Any periodic wave which is propagated without change in form (and therefore with constant velocity) in one direction is representable mathematically in the following form:

$$y = f(x - vt)$$

where (assuming a transverse vibration):

$y$ = instantaneous lateral displacement
$x$ = distance along direction of propagation
$t$ = time
$v$ = velocity of propagation The exact form of the wave function, $f$, will depend on the wave shape, but any periodic wave shape may be represented in terms of a Fourier series, as follows:

$$y = \frac{A_0}{2} + \sum_{n=1}^{\infty} [(A_n \cos \beta_n(x-vt) + B_n \sin \beta_n(x-vt))]$$

where $A_0$ = a constant representing the "D. C." component of the wave $A_n B_n$ = amplitudes of success harmonic components $$\beta_n = \frac{2\pi}{\lambda n}$$

where $\lambda_n$ = wave lengths of successive harmonic components.

Now by definition, the velocity of propagation is equal to the rate of change of distance:

$$v = \frac{dx}{dt}$$

but $$\frac{\frac{dy}{dt}}{\frac{dy}{dx}} = \frac{dx}{dt} = v$$

Consequently, the velocity may be derived from the ratio of the time rate of change to the space rate of change of the instantaneous amplitude. This may be proven for the type of wave assumed by differentiating the Fourier series expression first with respect to $t$ and then with respect to $x$ and taking the ratio:

E. g.

$$\frac{dy}{dt} = \sum_{n=1}^{\infty} [A_n \beta_n v \sin \beta_n(x-vt) - B_n \beta_n v \cos \beta_n(x-vt)]$$

If the velocity for each harmonic component is the same, the justification for which will be given later, we may factor it out of the series:

$$\frac{dy}{dt} = v\left\{\sum_{n=1}^{\infty}[A_n\beta_n \sin \beta_n(x-vt) - B_n\beta_n \cos \beta_n(x-vt)]\right\}$$

On the other hand, $$\frac{dy}{dx} = \sum_{n=1}^{\infty}[-A_n\beta_n \sin \beta_n(x-vt) + B_n\beta_n \cos \beta_n(x-vt)]$$

$$= -\sum_{n=1}^{\infty}[A_n\beta_n \sin \beta_n(x-vt) - B_n\beta_n \cos \beta_n(x-vt)]$$

Taking the ratio $$\frac{\frac{dy}{dt}}{\frac{dy}{dx}} = \frac{v\left\{\sum_{n=1}^{\infty}[A_n\beta_n \sin \beta_n(x-vt) - B_n\beta_n \cos \beta_n(x-vt)]\right\}}{-\left\{\sum_{n=1}^{\infty}[A_n\beta_n \sin \beta_n(x-vt) - B_n\beta_n \cos \beta_n(x-vt)]\right\}}$$

$$= -v$$

or $$v = -\frac{\frac{dy}{dt}}{\frac{dy}{dx}} \quad (Q.E.D.)$$

(The significance of the minus sign is that when the wave is traveling from left to right the rates of change must be measured in the opposite sense.)

The only restriction to this formula is that the wave be periodic in space and time. The pulse wave does not strictly comply with this requirement being a wave in a dissipative medium. The velocity of propagation is not therefore the same for all harmonics. This is obvious from the appearance of the pulse wave taken at two widely separated points as shown in Fig. 1 in which the numeral 10 represents the pulse wave from the sub-clavian artery, and the numeral 11 the pulse wave from the radial artery. It will be noticed that the radial pulse (delayed in time) is smoothed out somewhat, and consequently is of slightly altered wave form.

The change in form, however, requires a considerable distance to become manifest. Therefore, if all measurements along the direction of propagation are restricted to a very short distance, (e. g. one centimeter) then the change for this distance will be negligible to a high order of accuracy. The criterion should be that the distance along which measurements are taken should be small compared to the wave length of the highest order harmonic necessary accurately to represent the wave.

Figs. 2, 3, 4, 5, and 6 show the pulse wave forms for normal and pathological conditions of the system. The numeral 12 of Fig. 2 is a normal pulse curve (at the wrist). The numeral 13 of Fig. 3 is a similar wave in a case of aortic stenosis. The numeral 14 of Fig. 4 is for a case of aortic regurgitation. The numeral 15 of Fig. 5 is for a case of arterial hypertension, and the numeral 16 of Fig. 6 for a case of arterial hypertension.

These wave forms are representative of all types likely to be encountered. A graphical Fourier analysis shows harmonics of order higher than about the thirtieth to be of negligible amplitude. Since the wave length of the fundamental pulse wave is never less than three meters (in humans) that of the thirtieth harmonic would, therefore, never be less than 10 cms. It is obvious, therefore, that along a distance of one cm. any pulse wave that might be encountered can be considered to have a velocity which is the same for all harmonic components to a very high degree of accuracy.

Figure 8:
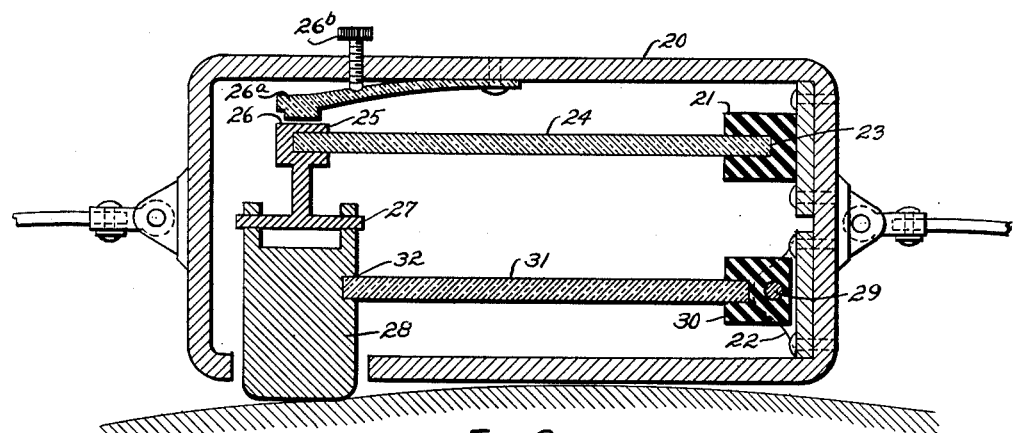
Figure 9:
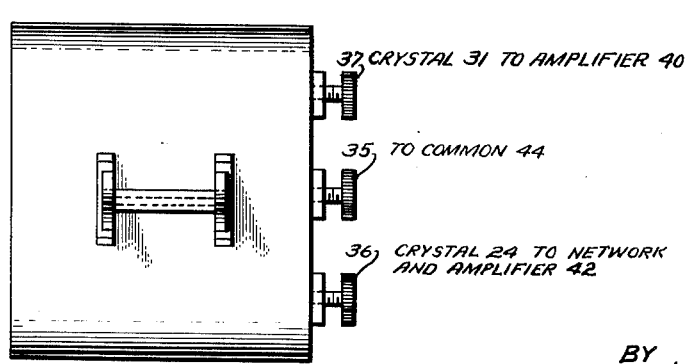
Fig. 9 is an end view of the same.

The pick-up device used in this embodiment of the invention comprises, as shown in Figs. 7, 8, and 9, a base 20 in the form of an enclosing casing having within it a pair of insulating brackets 21 and 22 attached to one wall thereof.

The bracket 21 has a horizontal slot 23 in which is clamped or cemented a flat, horizontally extending, bimorph piezo-electric crystal 24, the other end 25 of which is firmly attached to a bracket 26, which in turn is pivotally connected at 27 to a button 28, extending outwardly through the casing 20.

The bracket 22 has pivoted thereto about a horizontal pivot 29 a fork or clamp 30 which is firmly attached to a second bimorph crystal 31, the other end of which is firmly held in a slot 32 in button 28. Each of these crystals is provided with surface conductors in the usual manner and the upper conductor of the lower crystal is connected to the lower conductor of the upper crystal and to an external common terminal 35, while the upper conductor of the crystal 24 and the lower conductor of crystal 31 are connected to separate terminals 36 and 37 respectively. It will be understood that crystal 24 is fabricated to give the maximum response to flexure, while crystal 31 is fabricated to give the maximum response to torsion. Thus between terminals 36 and 35 we get an electrical voltage which is representative of the lateral instantaneous displacement (flexural component), and between terminals 37 and 35 we get an electrical voltage which represents the instantaneous slope (torsional component) of the motion of the button 28 in response to the pulse wave.

A spring button 26a controlled by a thumb screw 26b may be used to apply an initial pressure on the bracket 26 to counterbalance the pressure with which the button 28 is pressed against the flesh.

Let us now examine how this instrument with a button, say 1 cm. long and 0.5 cm. wide, may be used accurately to determine $dy/dx$ and $dy/dt$ of the pulse wave, by applying the button, for example, to the radial artery on the wrist. Referring now to Fig. 10, as the pulse wave passes, the button will be displaced laterally, executing at the same time a rotation about its central position.

The instantaneous amount of displacement is, of course, $y$, whereas we may denote the amount of simultaneous rotation by $\theta$ the angle between the slope of the wave and the $x$-axis at the point where the button is located).

Since the length of the button is very small compared to the length of the wave, we can write:

$$\frac{dy}{dx} = \tan \theta$$

But the angle $\theta$ will in any case be very small, probably never more than a fraction of a degree, since the maximum lateral displacements themselves in a sphygmographic recording are only of the order of a millimeter or less as compared to a wave length of many centimeters.

When $\theta$ is very small, therefore:

$$\tan \theta \approx \theta$$

to a very high order of accuracy.

Therefore we may state that:

$$\frac{dy}{dx} = \theta$$

or that the space rate of change of the instantaneous lateral displacement is equal to the rotational component of the motion of the button.

On the other hand, the time rate of change is easily measured directly from the time derivative of the translational component of the lateral displacement.

It follows that the quantity between terminals 37–35 gives directly $$\frac{dy}{dx}$$

whereas $$\frac{dy}{dt}$$

is the time derivative of the quantity between terminals 36–35. We need only, therefore, to pass the latter quantity through a differentiating network to secure two signals whose ratio at every instant is proportional to the pulse wave velocity, whereupon the ratio:

$$\frac{\frac{dy}{dt}}{\frac{dy}{dx}}$$

may be directly obtained by finding the ratio between these two signals.

The simplest method of measuring the ratio of two voltages is by means of a bridge circuit. The diagram of Fig. 11 illustrates a simple method of measuring the ratio, which although not direct reading, has the advantage of extreme simplicity.

The output voltages from each crystal element must, of course, be amplified individually before a measurement of their ratio is taken. Also the output of the flexural element must first be differentiated. The latter is most easily accomplished by connecting a resistance in parallel with the crystal element whose resistance is small (say $\frac{1}{10}$) compared to the capacitative reactance of the crystal at the highest order harmonic frequency (about 30 cycles per second).

It is likewise to be understood that the two signal voltages at the output of their respective amplifiers are proportional respectively to the rotational and time derivative of the translational components of the motion of the button. Hence the constants of proportionality of the two signals must be equalized before a correct absolute measurement can be made. This can be done by adjusting the relative gains of the two amplifiers.

The indication from these measurements may be obtained by the apparatus diagrammatically shown in Fig. 11. The following discussion represents methods and apparatus whereby the measurements may be made.

The output of the torsion element 31 is fed direct to an amplifier 40 while the output of the flexure element 24 is fed through a differentiating network 41 to an amplifier 42. The output of these amplifiers designated as $e_1$ and $e_2$ are, after equalization, proportional respectively to $$\frac{dy}{dx} \text{ and } \frac{dy}{dt}$$

These two quantities are placed across the two branches $R_1$ and $R_2$ of a potentiometer $R$, with the sliding tap 43 of the potentiometer connected to the common point 44 of the quantities $e_1$ and $e_2$ through a null indicator 45. When the null indicator indicates that the bridge is balanced, then the potentiometer reading will be proportional to the ratio $$\frac{e_1}{e_2}$$

or to $$\frac{dx}{dt}$$

the velocity.

A more complete diagram is shown in Fig. 12, in which the torsional element 31 is fed to amplifying tube VT-1, through a standard resistance coupling comprising resistances 46, 47, and condenser 48. For commercial crystals, resistance 46 may be of the order of one megohm or higher in the form of potentiometers that can be used for gain control, while the condenser may be of the order of four mf. in order to keep attenuation and frequency discrimination to a minimum.

A resistance 50 of the order of 2000 ohms across the flexure crystal 24 is connected to VT-2 by condenser 51 and resistance 52 similar to 48 and 47 respectively.

The plate circuits of these tubes may be identical each being energized by a battery 53 through plate resistances 54 and 55 respectively, and the common wire 56 is connected to the sliding tap $b$ of potentiometer $R$ by a "magic eye" null indicator. A dial 57 on the potentiometer shows the proportion, or pulse wave velocity, when the null point is reached.

The resistance 50 is considerably below the impedance of the crystal within the frequency range we are concerned with, and this assures that the voltage developed across it is proportional to the time rate of change of the flexural vibrations. (On the other hand, the resistance of one megohm across the torsional element should be higher than the impedance of the crystal in this range, so that its output is proportional directly to the amplitude of the rotational component.)

If the sensitivities and amounts of stress set up in both crystals were the same, the signal on the grid $VT_2$ would be considerably less than that on $VT_1$ due to the attenuating effect of the 2000 ohm resistance (as compared with one megohm). However, the flexural stress will be much greater than the torsional stress for a sphygmographic recording using a button of the type described, thus compensating for this attenuation. In the design of the pickup unit, the sensitivities of the two crystal elements should be so adjusted that for the normal stresses set up in the average sphygmograph, approximately equal voltages are fed into the grids of the two vacuum tubes. This will simplify the construction, allowing identically designed amplifier stages for each channel (use of a single tube containing dual sections) and increase the accuracy of measurement as well. (Since the measurement is to be made by balancing a bridge, the greatest accuracy is obtained when both sides of the bridge are equal or nearly so.)

A single stage employing high gain triodes should be ample for the amplification required for measurement. It is to be understood that if more amplification is desired, a pentode tube may be used or several stages in cascade, with any set of tubes, the best arrangement being a matter of engineering design.

Of course, the above method, while extremely simple and undoubtedly applicable for many purposes, is not direct reading, requiring a balancing operation. For long range recording or observations, some means for direct reading is desirable. The latter may be accomplished in several ways, see Fig. 13. First, instead of feeding the output of the bridge (between point $b$ and ground) to an indicator tube, it may be rectified by a diode 60, and passed through a D. C. meter 61. Then the current through the meter would indicate quantitatively the amount of unbalance. If, therefore, the ratio $R_1/R_2$ were held constant, e. g. by placing the tap $b$ at a point corresponding to the highest (or lowest) possible value of velocity, then the meter reading could be calibrated directly in terms of velocity, thus eliminating the necessity of manual balancing operation.

This arrangement is well known and yields a measurement closely equal to the crest value of the output of the bridge. A by-pass condenser 62 must be large enough to filter out all A. C. components from the rectified signal (otherwise the meter needle would vibrate) while at the same time have a leakage small compared with the current drawn by the meter. A series resistance 63 in the neighbourhood of one megohm should be used, whereas the impedance of the condenser should be of the order of 100,000 ohms or higher. It is, therefore, estimated that a condenser of 5 mfd. capacity will be required having a leakage less than one micro-ampere.

This capacity requirement will cause a certain time lag in the measurement since the condenser must be fully charged before the meter will come to equilibrium. For the estimated values this will require a few seconds and consequently the reading will not be instantaneous.

In case instantaneous direct readings are desirable (see Fig. 14), an electronic device, such as a cathode ray oscilloscope 65, may be used. This figure shows how an oscilloscope may be used as an instantaneous direct reading instrument.

As shown, the output from each amplifier $e_1$ and $e_2$ is connected directly to the oscilloscope, $e_1$ being fed into the horizontal deflecting plates 66 and $e_2$ to the vertical plates 67. Since the wave form of each signal will be identical, a single line tracing will appear on the screen of the oscilloscope (it being assumed that the amplifying circuits are all equalized as regards amplification and phase shift). Furthermore, the line will assume an orientation with respect to the horizontal depending on the ratio of the voltages $e_1$ and $e_2$.

In fact, once properly calibrated, we can write:

$$v=\frac{e_1}{e_2}=\tan \phi$$

A circular transparent scale (not shown) giving the value of the tangent in terms of the angle may be fastened to the screen or the luminous line used as a pointer to indicate directly the velocity of the pulse wave.

This method has the advantage of giving an instantaneous direct reading at any instant during a cycle. For example, the direction of the line traced on the screen is at every instant equal to the instantaneous velocity, so that variation in velocity will appear as variation in the angle or curvature of the line. Such variation will probably occur as a result of the variation in the stretching of the arterial walls during the cardiac cycle. The resulting cyclical changes in elasticity should cause a "wave of velocity" or periodic acceleration and deceleration of the pulse wave. The extent of this variation (in view of its cause) should be proportional to the pulse pressure, i. e. the difference between the systolic (maximum) and diastolic (minimum) blood pressures. Thus, by measuring the angle at the proper points (beginning and end of the cycle), we should obtain the pulse wave velocity during systole and diastole respectively, which, according to previous discussion, can be calibrated to give, for any one individual, the systolic and diastolic blood pressures. In particular, the instantaneous blood pressure will then be directly observable at all times. The value of this, especially during surgical operations, is apparent.

Finally, it should be noted that there are an almost limitless number of methods by which the readings may be taken, which are so well known that further discussion is superfluous.

It will be understood that these circuits are illustrative only, and the values suggested may be altered within wide limits. For example, also, if the differentiating network produces too great an attenuation of the signal, it will be obvious that a further amplification of the differentiated signal may be made.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

I claim:

1. A diagnostic apparatus, comprising a casing, a feeler mounted upon said casing adapted to contact an exteriorized artery for a substantial length thereof, means for supporting said feeler on said casing to permit both displacement and rotation of said feeler, including means to create an electrical quantity corresponding to the displacement and means to create an electrical quantity corresponding to the torsion, a differentiating network for obtaining the rate of change of said first mentioned quantity and electrical means for measuring the ratio between said differentiated quantity and said last mentioned quantity.

2. A diagnostic apparatus comprising a casing having at one end thereof a rigidly mounted block and a block pivoted thereto about a horizontal axis, a first piezo crystal mounted in said rigid block and carrying at its other end a bracket, said crystal being cut to give maximum electrical response to flexure of the crystal, a feeler adapted to rest upon an artery along a substantial portion of its length pivoted to said bracket about a horizontal pivot parallel to the direction of extension of said crystal, a second piezo crystal rigidly connected to said pivoted block and rigidly connected to said feeler, whereby rotation of said feeler about its pivot will create torsional strains in said second crystal, said second crystal being fabricated to give maximum electrical response to torsion, said crystals having conducting surfaces and electrodes connected to said surfaces.

3. A diagnostic apparatus comprising a casing having at one end thereof a rigidly mounted block and a block pivoted thereto about a horizontal axis, a first piezo crystal mounted in said rigid block and carrying at its other end a bracket, said crystal being cut to give maximum electrical response to flexure of the crystal, a feeler adapted to rest upon an artery along a substantial portion of its length pivoted to said bracket about a horizontal pivot parallel to the direction of extension of said crystal, a second piezo crystal rigidly connected to said pivoted block and rigidly connected to said feeler, whereby rotation of said feeler about its pivot will create torsional strains in said second mentioned crystal, said second crystal being fabricated to give maximum electrical response to torsion, said crystals having conducting surfaces and electrodes connected to said surfaces, a differentiating network connected to the electrodes from said first crystal, and means for determining the ratio of the output of said network and said first crystal.

4. A diagnostic apparatus comprising a casing having at one end thereof a rigidly mounted block and a block pivoted thereto about a horizontal axis, a first piezo crystal mounted in said rigid block and carrying at its other end a bracket, said crystal being cut to give maximum electrical response to flexure of the crystal, a feeler adapted to rest upon an artery along a substantial portion of its length pivoted to said bracket about a horizontal pivot parallel to the direction of extension of said crystal, a second piezo crystal rigidly connected to said pivoted block and rigidly connected to said feeler, whereby rotation of said feeler about its pivot will create torsional strains in said second crystal, said second crystal being fabricated to give maximum electrical response to torsion, said crystals having conducting surfaces and electrodes connected to said surfaces, a differentiating network connected to the electrodes from said first crystal, and means for determining the ratio of the output of said network and said first crystal comprising an oscilloscope.

CHARLES SHEER.

References Cited in the file of this patent
UNITED STATES PATENTS

| Number | Name | Date |
| --- | --- | --- |
| 2,114,578 | Strauss et al. | Apr. 19, 1938 |
| 2,439,495 | Sturm | Apr. 13, 1948 |
| 2,447,018 | Keinath | Aug. 17, 1948 |